United States Patent [19]

Kimoto et al.

[11] 4,382,123
[45] May 3, 1983

[54] FLUORINATED CATION EXCHANGE MEMBRANE AND PROCESS FOR PREPARING THE SAME

[75] Inventors: Kyoji Kimoto, Yokohama; Hirotsugu Miyauchi, Tokyo; Jukichi Ohmura, Yokohama; Mikio Ebisawa, Hiratsuka; Toshioki Hane, Kawasaki, all of Japan

[73] Assignee: Asahi Kasei Kogyo Kabushiki Kaisha, Oaska, Japan

[21] Appl. No.: 344,227

[22] Filed: Jan. 29, 1982

Related U.S. Application Data

[62] Division of Ser. No. 152,780, May 23, 1980, Pat. No. 4,332,665.

[30] Foreign Application Priority Data

May 31, 1979 [JP] Japan .................. 54-67887

[51] Int. Cl.³ .............................. B01J 47/12
[52] U.S. Cl. .................................. 521/27
[58] Field of Search .......................... 521/27

[56] References Cited

U.S. PATENT DOCUMENTS 4,294,943 10/1981 Onoue et al. ............ 521/27
4,340,680 7/1982 Asawa et al. ............ 521/27

FOREIGN PATENT DOCUMENTS 56-163126 12/1981 Japan ..................... 521/27

Primary Examiner—Joseph L. Schofer
Assistant Examiner—Peter F. Kulkosky
Attorney, Agent, or Firm—Birch, Stewart, Kolasch and Birch

[57] ABSTRACT

A fluorinated cation exchange membrane characterized by the gradual decrease in proportion of the density of carboxylic acid and/or carboxylate groups relative to the total density of carboxylic acid and/or carboxylate groups and sulfonic acid and/or sulfonate groups from one surface of the membrane to the other surface or an internal plane therewithin. The cation exchange membrane of the present invention can be prepared by treating one surface of a membrane comprising a fluorocarbon polymer containing pendant groups of the formula:

$$-OCF_2CF_2SO_2X$$

wherein each X independently is fluorine, chlorine, bromine, hydrogen, ammonium, a quaternary ammonium or a metal atom, with a treating agent having a reducing activity in the presence of a reaction controlling agent selected from carboxylic acids, sulfonic acids, alcohols, nitriles and ethers. The cation exchange membrane of the present invention has an excellent performance in use for electrolysis and can be used stably under severe electrolysis conditions for a long period of time without bringing about partial cleavage or peeling-off, cracking and/or blistering of the carboxylic acid group-richer surface layer thereof.

4 Claims, 1 Drawing Figure

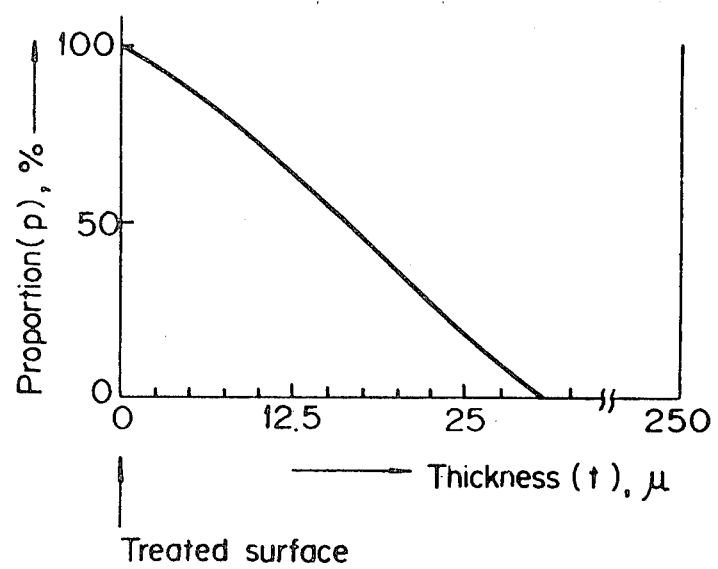

FLUORINATED CATION EXCHANGE MEMBRANE AND PROCESS FOR PREPARING THE SAME

This application is a divisional of copending application Ser. No. 152,780, filed on May 23, 1980, and now U.S. Pat. No. 4,332,665.

This invention relates to an improved cation exchange membrane of a fluorinated polymer and a method for the production thereof. More particularly, this invention relates to a cation exchange membrane of a polyfluorocarbon polymer containing pendant carboxylic acid and/or carboxylate (salt of carboxylic acid) groups and pendant sulfonic acid and/or sulfonate (salt of sulfonic acid) groups which is so improved as not to bring about partial cleavage or peeling-off, dot-like swelling and/or blistering of the carboxylic acid group-richer surface (richer when compared with the other surface) layer of the membrane in the course of the electrolysis of, for example, an aqueous solution of an alkali metal halide by the use of the cation exchange membrane under severe conditions and which is characterized by the gradual decrease in proportion of the density of carboxylic acid and/or carboxylate groups relative to the total density of carboxylic acid and/or carboxylate groups and sulfonic acid and/or sulfonate groups from one surface of the membrane to the other surface or an internal plane therewithin, and a process for producing such a membrane.

Many cation exchange membranes of fluorinated polymers have been proposed for use in the electrolysis of an aqueous solution of an alkali metal halide. For example, a cation exchange membrane of a fluorinated polymer containing pendant sulfonic acid and/or sulfonate groups has been known which is obtained by saponification (hydrolysis) of a membrane prepared from a copolymer of tetrafluoroethylene and perfluoro-3,6-dioxa-4-methyl-7-octene-sulfonyl fluoride. This known fluorinated polymer type cation exchange membrane containing only sulfonic acid and/or sulfonate groups, however, has such a disadvantage that the membrane, when used in the electrolysis of an aqueous solution of an alkali metal halide, tends to permit penetration therethrough of hydroxyl ions back-migrating from the cathode compartment because the membrane is liable to swell owing to the highly hydrophilic nature of the sulfonic acid and/or sulfonate groups. This disadvantage leads to low current efficiency during the electrolysis. Particularly when the electrolysis is carried out in the production of an aqueous solution of caustic soda having a sodium hydroxide concentration of at least 20% by weight, the current efficiency is so extremely low that the process is economically disadvantageous as compared with the electrolysis of aqueous solutions of sodium chloride by the conventional mercury process or diaphragm process.

The drawback of such low current efficiency can be alleviated to some extent by lowering the exchange capacity of a membrane having sulfonic acid and/or sulfonate groups as ion exchange groups, for example, to less than 0.7 milliequivalent per gram of dry resin in the hydride state (H or acid form) constituting the membrane because the hydrophilic nature of the membrane is so lowered that the swelling of the membrane during electrolysis is suppressed to some extent and, hence, the concentration of fixed ions in the membrane, which concentration is a determining factor in current efficiency, is rather high as compared with that in a swollen membrane made of a sulfonic acid and/or sulfonate group-containing resin having a higher exchange capacity in a dry state. For example, the use of a membrane having a lowered exchange capacity improves current efficiency in the electrolysis of sodium chloride for obtaining a 20% by weight aqueous solution of caustic soda to a level of about 80%. However, the lowering of exchange capacity of the membrane for improving the current efficiency results in such a serious increase in electric resistance of the membrane that the electrolysis process cannot be practiced economically. However low the exchange capacity of a perfluorinated cation exchange membrane containing only sulfonic acid and/or sulfonate groups as ion exchange groups may be with such a sacrifice that the electric resistance of it may increase, it is quite difficult to attain a current efficiency of about 90% during electrolysis by using such a membrane.

On the other hand, cation exchange membranes of fluorocarbon polymers containing only carboxylic acid and/or carboxylate groups as ion exchange groups are disclosed in British Pat. No. 1,497,748 and U.S. Pat. No. 4,065,366. Such membranes show a lesser tendency to swell and, hence, can have such a high concentration of fixed ions therein during electrolysis that a current efficiency of 90% or more can be realized. Further, the membranes are chemically stable enough to be used in electrolysis under usual conditions. However, the membranes containing carboxylic acid and/or carboxylate groups have higher electric resistances than the aforementioned membranes containing sulfonic acid and/or sulfonate groups. Therefore, when a membrane containing only carboxylic acid and/or carboxylate groups is used in electrolysis at a high current density, there arises a drawback that the unit consumption of electric power is extremely increased. Further, when such a membrane is used in an aqueous alkali solution having a high alkali concentration under severe conditions for a long period of time, there arises a drawback that the membrane gradually shrinks and becomes so brittle that laminar cleavage or peeling off and/or cracking of the surface portion of the membrane occurs, leading to the lowering of current efficiency.

In order to obviate the drawbacks accompanying the use of the membrane containing only carboxylic acid and/or carboxylate groups as ion exchange groups, there have been proposed a cation exchange membrane which is obtained by blending a fluorocarbon polymer containing carboxylic acid and/or carboxylate groups or groups changeable to carboxylic acid groups (hereinafter often referred to as "precursor groups") and a fluorocarbon polymer containing sulfonic acid and/or sulfonate groups or groups changeable to sulfonic acid groups (hereinafter often referred to as "precursor groups") and forming the blend into a membrane and, if the precursor groups are present in the membrane, saponifying the membrane (Japanese Patent Application Laid-Open Specification No. 36,589/1977) and a cation exchange membrane which is obtained by laminating a membrane of a fluorocarbon polymer containing carboxylic acid and/or carboxylate groups or precursor groups thereof and a membrane of a fluorocarbon polymer containing sulfonic acid and/or sulfonate groups or precursor groups thereof and, if the precursor groups are present, saponifying the laminated membrane (German Offenlegungsschrift No. 2,817,344). However, these polymers are so poor in compatibility with each other that it may be difficult to achieve satisfactory blending or lamination. Therefore, there remains an unsolved problem that the cation exchange membranes prepared from those polymers are liable to bring about peeling-off or cracking and/or blistering during the use thereof in electrolysis under severe conditions. Further, the cation exchange membrane of those polymers blended with each other is quite unsatisfactory from the viewpoint of skillful utilization of the high current efficiency-providing effect of the carboxylic acid and/or carboxylate groups and the low electric resistance-giving effect of the sulfonic acid and/or sulfonate groups because the membrane only shows a performance lying between that of a membrane containing only carboxylic acid and/or carboxylate groups and that of a membrane containing only sulfonic acid and/or sulfonate groups. This can also be said with respect to cation exchange membranes obtained by terpolymerizing a monomer having a carboxylic acid and/or carboxylate group or a precursor group thereof, a monomer having a sulfonic acid and/or sulfonate group or a precursor group thereof and a fluorinated olefin and forming the terpolymer into a membrane and, if the precursor groups are present in the membrane, saponifying the membrane (the above-mentioned Japanese Patent Application Laid-Open Specification No. 36,589/1977 and Japanese Patent Application Laid-Open Specification No. 23,192/1977).

In U.S. Pat. No. 4,151,053 (corresponding to British Pat. No. 1,523,047) and German Offenlegungsschrift No. 2,817,315, there are disclosed cation exchange membranes obtained by subjecting to chemical treatment one surface layer portion of a membrane of a fluorocarbon polymer containing sulfonic acid and/or sulfonate groups to form carboxylic acid and/or carboxylate groups in the one surface layer portion. Such cation exchange membranes are so effective for substantial prevention of back-migration or diffusion therethrough of hydroxide ions during electrolysis that a high current efficiency can be achieved. Further, since such cation exchange membranes, when positioned in an electrolytic cell, have the carboxylic acid and/or carboxylate groups only in the very thin surface layer portions thereof on the side facing a cathode and the sulfonic acid and/or sulfonate groups having a highly hydrophilic nature in the remaining portions thereof, the electric resistances of the membranes are so low that the electrolysis process can be practiced with a great advantage from the viewpoint of unit consumption of electric power.

However, there is a serious demand in the art for the development of a cation exchange membrane capable of being used under severer electrolysis conditions, i.e. at a higher current density and at a higher temperature. In this sense, the above-mentioned conventional cation exchange membranes are still unsatisfactory because unfavorable phenomena such as partial cleavage or peeling-off, dot-like swelling and/or blistering of the surface layer portion of the membranes occur during electrolysis under such severer conditions as is apparent from Comparative Example 1 which will be given later.

It is therefore an object of the present invention to provide a cation exchange membrane which can be used in electrolysis under severe conditions without the occurrence of unfavorable phenomena such as partial cleavage or peeling-off, dot-like swelling and/or blistering of the surface layer portion of the membrane and which has a high performance in use for electrolysis.

Another object of the present invention is to provide a process for preparing a cation exchange membrane of the kind described above.

The foregoing and other objects, features and advantages of the present invention will be apparent to those skilled in the art from the following detailed description and appended claims taken in connection with the accompanying drawing in which:

The FIGURE is a graph showing the relationship between the proportion (p) and the thickness (t), both of which are as defined hereinafter, in the cation exchange resin of the present invention prepared in Example 1 which will be given later.

We have made investigations into the causes of such unfavorable phenomena as mentioned above and intensive researches with a view to developing a cation exchange membrane which does not cause the unfavorable phenomena during electrolysis even under severe conditions mentioned above. As a result, we have found that the unfavorable phenomena as mentioned above do not occur in a cation exchange membrane wherein the proportion of the density of carboxylic acid and/or carboxylate groups relative to the total density of carboxylic acid and/or carboxylate groups and sulfonic acid and/or sulfonate groups in surfaces of the membrane or cross-sectional planes parallel to the surfaces of the membrane gradually decreases from one surface of the membrane to the other surface or a certain internal cross-section thereof.

More specifically, in accordance with one aspect of the present invention, there is provided a fluorinated cation exchange membrane comprising a fluorocarbon polymer containing pendant carboxylic acid and/or carboxylate groups and pendant sulfonic acid and/or sulfonate groups, the porportion of the density of pendant carboxylic acid and/or carboxylate groups relative to the total density of pendant carboxylic acid and/or carboxylate groups and pendant sulfonic acid and/or sulfonate groups being different between one surface and an internal plane in cross-section parallel to the surfaces of the membrane; which membrane comprises a fluorocarbon polymer containing pendant groups of the formula (1):

$$-OCF_2COOM \qquad (1)$$

wherein each M independently is hydrogen, ammonium, a quaternary ammonium or a metal atom, and pendant groups of the formula (2):

$$-OCF_2CF_2SO_3M \qquad (2)$$

wherein each M independently is as defined above, and wherein the proportion (p) represented by the equation (a):

$$p = A/(A+B) \times 100 \ (\%) \qquad (a)$$

wherein A is the density of pendant groups of the formula (1) and B is the density of pendant groups of the formula (2), is at least 20% in one surface of the membrane, and said proportion (p) gradually decreases from the one surface to the other surface or that plane within the membrane where A reaches zero, said proportion (p) and a thickness (t) in microns between the one surface and the other surface or a plane within the membrane in cross-section parallel to the surfaces of the membrane always satisfying the following inequality (b):

$$\{|\Delta p/\Delta t| \leq 12\ (\%/\mu)\} \qquad (b).$$

The inequality (b) means that the maximum descending gradient ($|\Delta p/\Delta t|$max) of the proportion (p) is at most 12% per micron in thickness of the membrane in a graph of Cartesian coordinates system having an ordinate representing the proportion (p) (%) and an abscissa representing the thickness (t) ($\mu$).

The fluorocarbon polymer constituting the cation exchange membrane of the present invention may further contain other ion exchange groups selected from phosphoric acid groups ($-PO_3H_2$), phosphate groups (salt of phosphoric acid group), phosphorous acid groups ($-PO_2H_2$), phosphite groups (salt of phosphorous acid group), phenolic hydroxyl groups, phenolic hydroxylate groups (salt of phenolic hydroxyl group) and sulfonamide groups ($-SO_2NH_2$, $-SO_2NHR$ wherein R is alkyl, or $-SO_2NHR'NH_2$ wherein R' is alkylene: reference may be made to U.S. Pat. Nos. 3,969,285 and 4,085,071).

The cation exchange membrane of the present invention is characterized in that it has such an excellent performance in use for electrolysis that it gives high current efficiency and has low electric resistance, that it is so stable, with respect to cleavage or peeling-off, dot-like swelling and/or blistering of the surface layer portion of the membrane, under severer electrolysis conditions than the usual electrolysis conditions as compared with conventional cation exchange membranes that the excellent performance of the membrane in use for electrolysis can be maintained for a long period of time, and that the production of the membrane is easy and inexpensive.

The excellent performance of the cation exchange membrane of the present invention in use for electrolysis can be attributed to the structure of the membrane that the proportion (p) is 20% to 100%, preferably 40% to 100%, more preferably 60% to 100%, in one surface of the membrane, the proportion (p) gradually decreasing from the one surface to the other surface or that plane within the membrane where A reaches zero, and the maximum descending gradient ($|\Delta p/\Delta t|$max) of proportion (p) to thickness (t) is at most 12%/$\mu$, preferably in the range of 0.1 to 12%/$\mu$, more preferably in the range of 0.5 to 10%/$\mu$, most preferably in the range of 2 to 8%/$\mu$. The proportion (p) in the surface opposite to said one surface of the membrane is preferably 0%, that is, the membrane of the present invention preferably contains substantially no carboxylic acid and/or carboxylate groups but sulfonic acid and/or sulfonate groups in the surface opposite to said one surface of the membrane.

When the cation exchange membrane of the present invention is used in the electrolysis of an aqueous solution of an alkali metal halide, it is usually advantageous to position the membrane in an electrolytic cell so that the carboxylic acid and/or carboxylate group-richer surface of the membrane faces the cathode. In this case, said surface shrinks because of the presence of carboxylic acid and/or carboxylate groups in the surface when contacted with a high concentration aqueous solution of an alkali. As a result, the concentration of fixed ions in the surface becomes so high that the membrane impedes effectively the penetration or back-migration therethrough and diffusion therein of hydroxyl ions, leading to high current efficiency.

The optimum proportion (p) in the carboxylic acid and/or carboxylate group-richer surface of the membrane of the present invention may be chosen depending on the equivalent weight (EW) of the membrane or the layer thereof containing carboxylic acid and/or carboxylate groups, and various factors such as a current density, electrolysis temperature and alkali concentration when the membrane is used in the electrolysis of an aqueous solution of an alkali metal halide. Equivalent weight is the weight of dry polymer in grams which contains one equivalent of potential ion exchange capacity. In general, as the equivalent weight of the membrane or the layer thereof containing carboxylic acid and/or carboxylate groups is higher, the proportion (p) may be lower. The equivalent weight of the membrane or the layer thereof containing carboxylic acid and/or carboxylate groups may be 1,000 to 2,800, preferably 1,100 to 2,000, more preferably 1,100 to 1,700. When the equivalent weight exceeds 2,800, the electric resistance of a membrane tends to become disadvantageously high. When the equivalent weight is less than 1,000, the mechanical strength of a membrane in use for electrolysis tends to be insufficient.

According to the preferred embodiment of the present invention, a cation exchange membrane contains carboxylic acid and/or carboxylate groups mainly in a thin layer on the side of one surface of the membrane and substantially contains only sulfonic acid and/or sulfonate groups in the remainder constituting the majority of the membrane. In this case, when alkali metal ions migrate from an anode chamber to a cathode chamber, the electric resistance of the membrane is extremely low as compared with a membrane containing only carboxylic acid and/or carboxylate groups as ion exchange groups.

The above-mentioned cation exchange membrane may be made of a composite membrane composed of two kinds of stratums of fluorinated polymers which differ in equivalent weight by 150 or more. In this case, it is preferred that the thickness of the stratum of a fluorinated polymer having the higher equivalent weight be up to a half the thickness of the whole membrane, and that carboxylic acid and/or carboxylate groups be present in the outer surface portion of the stratum of the fluorinated polymer having the higher equivalent weight.

The thickness of the cation exchange membrane of the present invention is generally in the range of from 40$\mu$ to 500$\mu$, preferably in the range of 100$\mu$ to 250$\mu$. The thickness of the layer containing carboxylic acid and/or carboxylate groups may be chosen depending on the equivalent weight of the layer and the electrolysis conditions under which the membrane of the present invention is used. In general, however, the thickness of a layer within the membrane from the carboxylic acid and/or carboxylate group-containing surface to that plane within the membrane where the density of carboxylic acid and/or carboxylate groups reaches zero may be at least 2.5$\mu$, preferably at least 7.5$\mu$, and the upper limit of the above-mentioned thickness varies depending on the permissible electric resistance of the membrane.

The cation exchange membrane of the present invention is very stable as compared with conventional cation exchange membranes even when it is used under such electrolysis conditions that the membrane is in contact with an aqueous high concentration alkali solution at a high current density and at a high temperature. The reason for this resides in that the proportion (p) of the density of carboxylic acid and/or carboxylate groups relative to the total density of carboxylic acid and/or carboxylate groups and sulfonic acid and/or sulfonate groups gradually decreases with the gradient being within a specific range from one surface of the membrane to the other surface or that plane within the membrane where the density of carboxylic acid and/or carboxylate groups reaches zero.

Cation exchange membranes as disclosed in Japanese Patent Application Laid-Open Specification No. 36,589/1977 and German Offenlegungsschrift No. 2,817,344 which are prepared by a blending method or a lamination method wherein a carboxylic acid and/or carboxylate group-containing polymer and a sulfonic acid and/or sulfonate group-containing polymer are used, are liable, owing to insufficient blending or lamination, to bring about peeling-off (particularly in the case of a laminated membrane) or cracking and/or blistering in a short period of time when used in electrolysis under severe conditions, as described hereinbefore.

According to our knowledge, cation exchange membranes as disclosed in U.S. Pat. No. 4,151,053 and German Offenlegungsschrift No. 2,817,315 which are prepared by chemical treatment to convert sulfonic acid groups in one surface layer of a membrane into carboxylic acid groups, are also liable to bring about partial peeling-off, dot-like swelling and/or blistering of the carboxylic acid and/or carboxylate group-containing layers thereof in electrolysis under severe conditions because the membranes have substantially no gradually decreasing density of carboxylic acid and/or carboxylate groups with gradients as specified in the present application from one surface of each membrane to the other surface or that plane within each membrane where the density of carboxylic acid and/or carboxylate groups reaches zero. Accordingly, such membranes are unable to prevent the lowering of current efficiency and the rise of electric resistance.

By contrast, the membrane of the present invention can be used even at a high current density of, for example, 70 A/dm$^2$ for a long period of time without the occurrence of peeling-off, cracking etc. of the carboxylic acid and/or carboxylate group-containing layer of the membrane. Thus, the high performance of the membrane in use for electrolysis can be stably maintained for a long period of time.

The membrane of the present invention may be laminated to reinforcing materials to improve the mechanical strength. For this purpose, fabrics or nets made of polytetrafluoroethylene fibers are most suitable. A porous polytetrafluoroethylene sheet or film is also useful. A reinforcing material is usually embedded in the sulfonic acid and/or sulfonate group-richer surface portion of the membrane. Where the membrane is a composite membrane as described hereinbefore, the reinforcing material is usually embedded in the stratu of a polymer having a lower equivalent weight. Alternatively, a fibrous polytetrafluoroethylene may be incorporated into the membrane for improving the mechanical strength thereof.

In accordance with another aspect of the present invention, there is provided a process for the preparation of a fluorinated cation exchange membrane comprising treating, with a treating agent selected from the group consisting of an aqueous reducing solution of an inorganic acid, an aqueous reducing solution of an inorganic salt, an aqueous reducing solution of hydrazine, an aqueous reducing solution of an inorganic acid and an inorganic salt, and an aqueous reducing solution of an inorganic salt and hydrazine, one surface of a membrane comprising a fluorocarbon polymer containing pendant groups of the formula (3):

$$-OCF_2CF_2SO_2X \qquad (3)$$

wherein each X independently is fluorine, chlorine, bromine, hydrogen, ammonium, a quaternary ammonium or a metal atom, to convert part of the pendant groups of the formula (3) into pendant groups of the formula (1):

$$-OCF_2COOM \qquad (1)$$

wherein each M independently is hydrogen, ammonium, a quaternary ammonium or a metal atom, said fluorinated cation exchange membrane comprising a fluorocarbon polymer containing pendant carboxylic acid and/or carboxylate groups and pendant sulfonic acid and/or sulfonate groups, the proportion of the density of pendant carboxylic acid and/or carboxylate groups relative to the total density of pendant carboxylic acid and/or carboxylate groups and pendant sulfonic acid and/or sulfonate groups being different between one surface and an internal plane in cross-section parallel to the surfaces of the membrane;

which process is characterized in that one surface of a membrane comprising a fluorocarbon polymer containing pendant groups of the formula (3):

$$-OCF_2CF_2SO_2X \qquad (3)$$

wherein each X independently is fluorine, chlorine, bromine, hydrogen, ammonium, a quaternary ammonium or a metal atom, is treated with a treating agent selected from the group consisting of an aqueous reducing solution of at least one inorganic acid, an aqueous reducing solution of at least one inorganic salt, an aqueous reducing solution of hydrazine, an aqueous reducing solution of at least one inorganic acid and at least one inorganic salt, and an aqueous reducing solution of at least one inorganic salt and hydrazine, in the presence of at least one reaction controlling agent selected from the group consisting of $C_1$–$C_{12}$ carboxylic acids, $C_1$–$C_{12}$ sulfonic acids, $C_1$–$C_{12}$ alcohols, $C_1$–$C_{12}$ nitriles and $C_2$–$C_{12}$ ethers, provided that when the treating agent includes hydrazine, said at least one reaction controlling agent is selected from $C_1$–$C_{12}$ alcohols, $C_1$–$C_{12}$ nitriles and $C_2$–$C_{12}$ ethers, thereby to prepare a fluorinated cation exchange membrane which comprises a fluorocarbon polymer containing pendant groups of the formula (1):

$$-OCF_2COOM \qquad (1)$$

wherein each M independently is hydrogen, ammonium, a quaternary ammonium or a metal atom, and pendant groups of the formula (2):

$$-OCF_2CF_2SO_3M \qquad (2)$$

wherein each M independently is as defined above, and wherein the proportion (p) represented by the equation (a):

$$p = A/(A+B) \times 100 (\%) \tag{a}$$

wherein A is the density of pendant groups of the formula (1) and B is the density of pendant groups of the formula (2), is at least 20% in one surface of the membrane, and said proportion (p) gradually decreases from the one surface to the other surface or that plane within the membrane where A reaches zero, said proportion (p) and a thickness (t) in microns between the one surface and the other surface or a plane within the membrane in cross-section parallel to the surfaces of the membrane always satisfying the following inequality (b):

$$|\Delta p / \Delta t| \leq 12 (\%/\mu) \tag{b}$$

The membrane comprising a fluorocarbon polymer containing pendant groups of the formula (3) which membrane is to be used as a starting material in the process of the present invention can be prepared as follows.

Firstly, the copolymerization of tetrafluoroethylene with at least one fluorinated vinyl monomer containing a sulfonyl fluoride group and represented by the general formula (4):

$$\begin{array}{cc} CF_2=CF & R_F \\ | & | \\ O(CF_2CFO)_{\overline{n}} CF_2CF_2SO_2F \end{array} \tag{4}$$

wherein $R_F$ is F, $CF_3$ or $CF_2OCF_3$ and n is an integer of 0 to 3, is carried out. A fluorinated vinyl monomer of the formula (4) wherein $R_F$ is $CF_3$ and n is 1 is preferably used. According to need, at least one fluorinated vinyl monomer of the general formula (5):

$$CF_2=CF-D \tag{5}$$

wherein D is Cl, $CF_3$, $OCF_3$ or $OC_3F_7$, may be used as a third monomer in the above-mentioned copolymerization.

Other monomer(s) may be used as further optional monomers in small amounts in the copolymerization for incorporating into the final cation exchange membrane other ion exchange groups as mentioned hereinbefore than carboxylic acid and/or carboxylate groups and sulfonic acid and/or sulfonate groups.

The mixing molar ratio of tetrafluoroethylene and at least one fluorinated vinyl monomer of the formula (4) and, if desired, at least one fluorinated vinyl monomer of the formula (5) and other monomer(s) may usually be so adjusted that the copolymer to be obtained has monomer units in amounts such as will satisfy the following inequality: $0.04 \leq m \leq 0.15$, preferably $0.06 \leq m \leq 0.13$, more preferably $0.07 \leq m \leq 0.13$ wherein m =
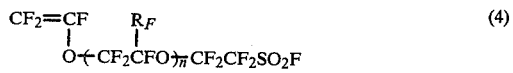

This substantially corresponds to the situation that the equivalent weight of the copolymer is usually in the range of from 1,000 to 2,800, preferably in the range of from 1,100 to 2,000, more preferably in the range of from 1,100 to 1,700.

On the other hand, the molar ratio represented by the formula:

is usually in the range of from 0 to 0.20, preferably in the range of from 0 to 0.10, more preferably in the range of from 0 to 0.05.

The copolymer used for the production of a membrane to be used as a starting material in the process of the present invention may be prepared according to any of the customary polymerization methods known in the art for homopolymerization of copolymerization of a fluorinated ethylene, such as methods using a non-aqueous system, methods using an aqueous system and a method using ultraviolet rays. The copolymerization is usually effected at a temperature of 0° to 200° C. under a pressure of 1 to 200 Kg/cm². The copolymerization in a non-aqueous system is carried out in an inert fluorinated solvent in mos: cases. As suitable inert fluorinated solvents, there can be mentioned 1,1,2-trichloro-1,2,2-trifluoroethane, and perfluorocarbons such as perfluoromethylcyclohexane, perfluorodimethylcyclobutane, perfluorooctanes, perfluorobenzene and the like. The aqueous system polymerization is accomplished by contacting monomers with an aqueous medium containing a free radical polymerization initiator and a suspension-forming agent to produce a slurry of polymer particles or granules, or by contacting monomers with an aqueous medium containing a free radical polymerization initiator and a dispersant inactive for the telomerization of monomers to produce a colloidal dispersion of polymer particles, followed by the coagulation of the dispersion.

Secondly, after the polymerization, the resultant copolymer is molten and shaped into a thin membrane using any of a variety of well known techniques.

The copolymer, after being shaped into a membrane, can be laminated with a reinforcing material such as a fabric or net for improvement of the mechanical strength. As the reinforcing material, fabrics and nets made of polytetrafluoroethylene fibers are most suitable. A porous polytetrafluoroethylene sheet or film is also useful. Alternatively, a fibrous polytetrafluoroethylene may be incorporated into the copolymer and the resulting mixture may be molten and shaped into a membrane for improving the mechanical strength thereof.

In the case of the cation exchange membrane of a composite membrane which is the preferred embodiment of the invention as described above, two kinds of copolymers differing in equivalent weight by 150 or more are prepared according to the polymerization methods as described above, followed by shaping into thin films, and fabricating into a composite membrane. In this composite membrane, it is preferred that the thickness of the stratum made of the thin film of the polymer having a higher equivalent weight be up to half the thickness of the whole membrane, and that a reinforcing material as mentioned above, if used, be embedded in the stratum made of the thin film having a lower equivalent weight.

Thirdly, according to need, groups contained in the copolymer constituting the membrane and represented by the formula (6):

$$-OCF_2CF_2SO_2F \qquad (6)$$

are partially or totally converted into groups of the formula (7):

$$-OCF_2CF_2SO_2X' \qquad (7)$$

wherein each X' independently is chlorine, bromine, hydrogen, ammonium, a quaternary ammonium or a metal atom. The conversion may be effected according to either a method (I) or a method (II) as described below.

METHOD (I)

Sulfonyl fluoride groups contained in the groups of the formula (6) are optionally saponified to form sulfonic acid and/or sulfonate (salt of sulfonic acid) groups. The sulfonyl fluoride groups or the sulfonic acid and/or sulfonate groups are subjected to treatment with a reducing agent to form sulfinic acid and/or sulfinate (salt of sulfinic acid) groups. Examples of reducing agents useful in this treatment are metallic hydrides of the general formula $MeLH_4$ (wherein Me is an alkali metal, L is aluminum or boron), or the general formula $\text{Mé}H_y$ (wherein Mé is an alkali or alkaline earth metal and y is 1 or 2) among those reducing agents as disclosed in U.S. Pat. No. 4,151,053.

As such metallic hydrides, there can be mentioned lithium aluminum hydride, lithium boron hydride, potassium boron hydride, sodium boron hydride, sodium hydride, lithium hydride, potassium hydride, barium hydride, calcium hydride and the like. The optimum treating conditions may be chosen depending on the kind of reducing agent, the kind of functional groups to be subjected to the treatment, and the like. In general, the treatment or reaction temperature is in the range of from $-50°$ C. to $250°$ C., preferably in the range of from $0°$ C. to $150°$ C. The reducing agent is usually used in the form of a solution. As a solvent useful for the preparation of a solution of the reducing agent, there can be mentioned water; polar organic solvents such as methanol, tetrahydrofuran, diethyleneglycol dimethyl ether, acetonitrile, propionitrile and benzonitrile; nonpolar organic solvents such as n-hexane, benzene and cyclohexane; and mixed solvents thereof. The amount of the reducing agent to be used is at least the same in equivalents as that amount of functional groups to be subjected to the treatment which is present in the copolymer constituting the membrane. However, it is preferred that a largely excessive amount of the reducing agent be used. The pressure employed in the treatment is not critical and may be atmospheric or super-atmospheric pressures, but the treatment is usually carried out under atmospheric pressure. The treatment or reaction period of time is usually in the range of from 1 minute to 100 hours. The sulfinic acid and/or sulfinate groups formed by the treatment may be partially or totally reacted with chlorine and/or bromine to form sulfonyl chloride and/or sulfonyl bromide groups.

METHOD (II)

Sulfonyl fluoride groups contained in the groups of the formula (6) are saponified to form sulfonic acid and/or sulfonate (salt of sulfonic acid) groups. The sulfonic acid and/or sulfonate groups are reacted with a reactant selected from phosphorus halides and sulfur halides wherein the halide is chloride or bromide to form sulfonyl chloride and/or sulfonyl bromide groups. Examples of such a reactant include $PCl_5$, $POCl_3$, $SO_2Cl_2$, $PCl_3$, $PBr_5$, $POBr_3$, $PBr_3$ and mixtures thereof. Other halogenating agents similar to those mentioned above may also be used. In the case of this method (II), only chlorine and bromine are possible as X' in the formula (7).

Thus, a membrane comprising a fluorocarbon polymer containing pendant groups of the formula (3):

$$-OCF_2CF_2SO_2X \qquad (3)$$

wherein each X independently is fluorine, chlorine, bromine, hydrogen, ammonium, a quaternary ammonium and a metal atom, is obtained.

According to the process of the present invention, one surface of a membrane comprising a fluorocarbon polymer containing pendant groups of the formula (3) is treated with a treating agent selected from the group consisting of an aqueous reducing solution of at least one inorganic acid, an aqueous reducing solution of at least one inorganic salt, an aqueous reducing solution of hydrazine, an aqueous reducing solution of at least one inorganic acid and at least one inorganic salt, and an aqueous reducing solution of at least one inorganic salt and hydrazine, in the presence of at least one reaction controlling agent selected from the group consisting of $C_1-C_{12}$ carboxylic acids, $C_1-C_{12}$ sulfonic acids, $C_1-C_{12}$ alcohols, $C_1-C_{12}$ nitriles and $C_2-C_{12}$ ethers, provided that when the treating agent includes hydrazine, said at least one reaction controlling agent is selected from $C_1-C_{12}$ alcohols, $C_1-C_{12}$ nitriles and $C_2-C_{12}$ ethers. It is preferred that the treating agent selected from the above-mentioned aqueous reducing solutions be used in the form of a mixture thereof with a reaction controlling agent. The use of the mixture (solution) of the treating agent and the reaction controlling agent is advantageous from the viewpoints of ease in operation of the treatment and ease in control of the reaction, which are relatively poor when the treatment is carried out by contacting one surface of the membrane with the reaction controlling agent and subsequently contacting the one surface with the treating agent.

Examples of inorganic acids that may be used as a reducing agent in the treating agent to be used in the process of the present invention include hydriodic acid, hydrobromic acid, hypophosphorous acid, hydrogen sulfide, arsenious acid, phosphorous acid, sulfurous acid and nitrous acid. Examples of inorganic salts that may be used as a reducing agent in the treating agent are ammonium, or alkali or alkaline earth metal salts of the above-mentioned inorganic acids that are soluble in water or a mixture of water and a reaction controlling agent. A mixture of different inorganic acids, a mixture of different inorganic salts, a mixture of an inorganic acid and an inorganic salt or any other conceivable mixture may be used in the treating agent as long as the ingredients in the mixture are not reactive with each other.

The treating agent containing a reducing agent as mentioned above is usually used in a large excess.

A wide variety of reaction controlling agents can be used in combination with an appropriate treating agent in the process of the present invention insofar as they are inert to the groups of the formula (3) and the reducing inorganic acid or its salt or hydrazine contained in the treating agent. It is noted that hydrazine reacts with an acid to form a salt.

The mechanism of the action of reaction controlling agent for achieving the purpose of the present invention has not been elucidated yet, but is believed to be such that the reaction controlling agent functions as a medium for increasing the affinity of a membrane being treated for a reducing agent selected from inorganic acids, inorganic salts and hydrazine and promoting the penetration of the reducing agent into the interior of the membrane to enable the reducing agent to react with the membrane not only at the surface layer portion but also in the internal portion of the membrane and, in extreme cases, even at the surface layer portion opposite to the surface contacted with the treating agent.

Examples of $C_1$–$C_{12}$ carboxylic acids and $C_1$–$C_{12}$ sulfonic acids that may be used as the reaction controlling agent in the process of the present invention include monobasic or polybasic acids such as formic acid, acetic acid, propionic acid, n-butyric acid, isobutyric acid, n-valeric acid, caproic acids, n-heptanoic acid, caprylic acids, lauric acid, fluoroacetic acid, chloroacetic acid, bromoacetic acid, dichloroacetic acid, malonic acid, glutaric acid, trifluoroacetic acid, perfluoropropionic acid, perfluorobutyric acids, perfluorovaleric acids, perfluorocaproic acids, perfluoro-n-heptanoic acid, perfluorocaprylic acids, perfluoroglutaric acid, trifluoromethanesulfonic acid, perfluoroheptanesulfonic acids, methanesulfonic acid, ethanesulfonic acid, propanesulfonic acids, butanesulfonic acids, pentanesulfonic acids, hexanesulfonic acids and heptanesulfonic acids. Preferred are acetic acid, propionic acid, caprylic acids, trifluoroacetic acid, perfluorocaprylic acids, perfluorobutyric acids and perfluoroheptanesulfonic acids.

Examples of $C_1$–$C_{12}$ alcohols that may be used as the reaction controlling agent include monohydric or polyhydric alcohols such as methanol, ethanol, propanol, ethylene glycol, diethylene glycol, 1,4-butanediol, 1,8-octanediol and glycerin. Preferred are methanol and ethanol.

Examples of $C_1$–$C_{12}$ nitriles that may be used as the reaction controlling agent include acetonitrile, propionitrile and adiponitrile.

Examples of $C_2$–$C_{12}$ ethers that may be used as the reaction controlling agent include diethyl ether, tetrahydrofuran, dioxane, monoethyleneglycol dimethyl ether, diethyleneglycol dimethyl ether, triethyleneglycol dimethyl ether and tetraethylene glycol dimethyl ether.

The treating agent to be used in the process of the present invention may usually be an aqueous solution containing 2 to 95% by weight, preferably 5 to 90% by weight, more preferably 10 to 80% by weight, of a reducing agent selected from inorganic acids, inorganic salts and hydrazine. When a mixture of the treating agent and a reaction controlling agent is used in the process of the present invention, the mixture may usually contain 100 ppm to 80% by weight, preferably 1,000 ppm to 80% by weight, of the reaction controlling agent. However, it is noted that the mixing ratio of water and the reducing agent and, if present, the reaction controlling agent cannot be chosen independently but depending on the equivalent weight of a membrane to be treated, the compatibility of the reducing agent and, if present, the reaction controlling agent with water, the intended gradient of proportion (p) to thickness (t), and the intended thickness of a layer containing carboxylic acid and/or carboxylate groups. In general, the higher the reducing agent concentration of the treating agent or the mixture thereof with the reaction controlling agent, the higher the proportion (p) in the treated surface of the membrane tends to be, and the lower the mixing ratio of water to the reaction controlling agent in the mixture thereof with the treating agent, the larger the thickness of the treated layer containing carboxylic acid and/or carboxylate groups.

The treatment of one surface of a membrane with the above-mentioned treating agent or mixture thereof with the reaction controlling agent may usually be carried out at a temperature of from 0° C. to 150° C., preferably from 30° C. to 120° C., for a period of from 1 hour to 70 hours, preferably from 3 hours to 50 hours. According to need, for decreasing the amount of sulfinic acid and/or sulfinate groups that may be formed in the course of the above-mentioned treatment, the thus treated membrane may be treated with an acidic aqueous solution of hydrochloric acid, sulfuric acid or the like while heating and subjected to a saponification treatment with an alkali, and, optionally, subjected to a oxidation treatment with an aqueous solution of sodium hypochlorite or the like.

Thus, a fluorinated cation exchange membrane of the present invention is obtained which comprises a fluorocarbon polymer containing pendant groups of the formula (1):

$$-OCF_2COOM \qquad (1)$$

wherein each M independently is hydrogen; ammonium; a quaternary ammonium, particularly a quaternary ammonium having a molecular weight of 500 or less; or a metal atom, particularly an alkali metal such as sodium or potassium or an alkaline earth metal, and pendant groups of the formula (2):

$$-OCF_2CF_2SO_3M \qquad (2)$$

wherein each M independently is as defined above, and wherein the proportion (p) represented by the equation (a):

$$p = A/(A+B) \times 100 \, (\%) \qquad (a)$$

wherein A is the density of pendant groups of the formula (1) and B is the density of pendant groups of the formula (2), is at least 20% in one surface of the membrane, and said proportion (p) gradually decreases from the one surface to the other surface or that plane within the membrane where A reaches zero, said proportion (p) and a thickness (t) in microns between the one surface and the other surface or a plane within the membrane in cross-section parallel to the surfaces of the membrane always satisfying the following inequality (b):

$$|\Delta p/\Delta t| \leq 12 (\%/\mu) \qquad (b).$$

In the following Examples and Comparative Examples, the gradients of proportion (p) to thickness (t) were examined as follows. A cation exchange membrane (r) having the same ion exchange capacity as that of a cation exchange membrane (s) to be examined with respect to gradients of proportion (p) to thickness (t)

and containing no pendant sulfonic acid and/or sulfonate groups but pendant carboxylic acid and/or carboxylate groups into which all the —CF$_2$SO$_2$X groups in the groups of the formula (3) were converted was prepared in substantially the same manner as in the case of the preparation of the cation exchange membrane (s) except that the conversion was completely effected. The membrane (r) was subjected to measurement of attenuated total reflection spectrum (hereinafter referred to as A.T.R.) to find an absorbance with respect to an absorption band characteristic of carboxylic acid and/or carboxylate groups, said absorbance being calculated based on the base line method and being evaluated as 100% in relative absorbance. The membrane (s) was subjected, on the side of the carboxylic acid and/or carboxylate group-richer surface, to measurement of A.T.R. to find an absorbance and a relative absorbance (P$_0$%) with respect to an absorption band characteristic of carboxylic and/or carboxylate groups. Subsequently, the membrane (s) was shaved on the above-mentioned side by a given thickness (T$_1\mu$) and subjected to measurement of A.T.R. in the same manner as described above to find a relative absorbance (P$_1$%), said given thickness being obtained by subtracting the thickness measured of the shaved membrane (s) from the thickness measured of the initial membrane (s). The relative absorbance (P$_0$%) corresponds to the proportion (p) in the above-mentioned surface when the thickness (t) is 0, and the relative absorbance (P$_1$%) corresponds to the proportion (p) in a plane within the membrane in cross-section parallel to the surfaces of the membrane when the thickness (t) is T$_1\mu$. Substantially the same procedures as described above were repeated to find relative absorbances (P$_2$%, P$_3$%, ...) in connection with thicknesses (T$_2\mu$, T$_3\mu$, ..., respectively). The relative absorbances (P$_0$%, P$_1$%, P$_2$%, P$_3$% ...) were plotted against the thicknesses (0$\mu$, T$_1\mu$, T$_2\mu$, T$_3\mu$ ...) to form a graph having an ordinate representing the proportion (p) and an abscissa representing the thickness (t). The gradients of proportion (p) to thickness (t) were found from the graph. The measurement of A.T.R. was carried out by using a combination of a diffraction grating infrared spectrophotometer Model IRA-2 and an attenuated total reflector Model ATR-6 (tradenames of products manufactured by Japan Spectroscopic Company, Ltd., Japan).

The following Examples illustrate the present invention in more detail but should not be construed as limiting the scope of the invention.

EXAMPLE 1

16 g of

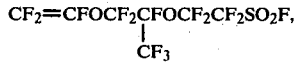

0.16 g of ammonium persulfate and 160 ml of water free of oxygen were charged into a 500 cc stainless steel autoclave. The resulting mixture was emulsified with 1.6 g of ammonium perfluorooctanoate as an emulsifier. The copolymerization was carried out at 50° C. for 9 hours by introducing tetrafluoroethylene into the emulsion under a tetrafluoroethylene pressure of 5.5 Kg/cm$^2$ and using 0.007 g of sodium hydrogensulfite as a promotor. Part of the copolymer obtained was saponified with a mixture of 6 N aqueous caustic soda and methanol (1:1 by volume), and the ion exchange capacity of the saponified copolymer was examined to find an ion exchange capacity of 0.81 milliequivalent per gram of dry polymer.

The rest of the copolymer was washed with water, shaped into a membrane of 250$\mu$ in thickness and saponified with a mixture of 6 N aqueous caustic soda and methanol (1:1 by volume). The resulting membrane was sufficiently dried, and dipped in a solution of phosphorus pentachloride in phosphorus oxychloride (mixing weight ratio=1:3) at 110° C. for 20 hours. The membrane thus treated was subjected to measurement of A.T.R., which showed a strong absorption band at 1420 cm$^{-1}$ characteristic of sulfonyl chloride. Between frames made of acrylic resin, two sheets of this membrane were fastened in position by means of packings made of polytetrafluoroethylene. The frames having the two sheets of the membrane were immersed in a mixed solution of an aqueous 57 weight percent hydriodic acid solution and glacial acetic acid (volume ratio=11:1; at 72° C. for 17 hours. The membrane was then subjected to saponification treatment with an aqueous sodium hydroxide solution and to oxidation treatment with an aqueous 5 weight percent sodium hypochlorite solution at 90° C. for 16 hours. The A.T.R. of the membrane was then measured. The absorption band at 1690 cm$^{-1}$ characteristic of carboxylate (salt of carboxylic acid) groups was observed when the membrane surface treated with the mixed solution containing hydriodic acid was subjected to measurement of A.T.R., whereas the absorption band at 1060 cm$^{-1}$ characteristic of sulfonate (salt of sulfonic acid) groups was observed when the membrane surface not treated with the mixed solution containing hydriodic acid was subjected to measurement of A.T.R. The cross-section of the membrane cut perpendicularly to the surfaces thereof was subjected to dyeing treatment with an aqueous Malachite Green solution having a pH value of 2. A layer having a thickness of about 14$\mu$ on the side of the membrane surface treated with the mixed solution containing hydriodic acid was dyed blue while the rest of the cross-section of the membrane was dyed yellow [in general, a layer having a proportion (p) of more than about 60% is dyed blue].

The cation exchange membrane obtained in this Example was step-wise shaved on the side of the membrane surface treated with the mixed solution containing hydriodic acid and subjected to measurement of A.T.R. to find a proportion (p) in each step as follows.

t=0$\mu$ ... p=100% t=5$\mu$ ... p=86% t=10$\mu$ ... p=72% t=15$\mu$ ... p=50% t=20$\mu$ ... p=36% t=31$\mu$ ... p=0%

From the above data, the graph shown in the Figure was obtained to find a maximum descending gradient ($|\Delta p/\Delta t|$max) of 4.4%/$\mu$.

The performance of the cation exchange membrane of this Example in use for electrolysis was evaluated as follows. The cation exchange membrane was incorporated in an electrolytic cell having a service area of 0.3 dm$^2$ (5 cm×6 cm) in such a way that the carboxylate group-containing surface of the membrane faces the cathode to provide an anode chamber and a cathode chamber separated by the membrane. The anode was a metal electrode excellent in dimensional stability and the cathode was an iron electrode. An aqueous saturated sodium chloride solution adjusted to a pH value of 3 by continuously adding hydrochloric acid was circulated through the anode chamber, and an aqueous 8 N caustic soda solution was circulated through the cathode chamber while adding water to the solution to maintain the caustic soda concentration thereof constant. Under these conditions, electric current was passed between the electrodes at a current density of 70 A/dm$^2$. The electrolysis was carried out at about 90° C. The current efficiency was calculated by dividing the amount of caustic soda produced in the cathode chamber per hour by the theoretical value calculated from the amount of electricity passed.

The changes of current efficiency and cell voltage with time are shown in Table 1.

TABLE 1

| Electrolysis time (hours) | 24 | 720 |
|---|---|---|
| Current efficiency (%) | 93 | 93 |
| Cell voltage (volts) | 4.2 | 4.2 |

After completion of the electrolysis, the used membrane was visually observed to find no physical damage such as partial peeling-off, cracking, blistering or the like.

COMPARATIVE EXAMPLE 1

A cation exchange membrane was prepared in substantially the same manner as in Example 1 except that an aqueous 57 weight percent hydriodic acid solution alone was used in place of a mixed solution as used in Example 1 and composed of an aqueous 57 weight percent hydriodic acid solution and glacial acetic acid and the immersion treatment in this hydriodic acid solution was effected at 83° C. for 20 hours. The A.T.R. of the membrane was then measured. The absorption band at 1690 cm$^{-1}$ characteristic of carboxylate (salt of carboxylic acid) groups was observed when the membrane surface treated with the hydriodic acid solution was subjected to measurement of A.T.R. The membrane surface treated with the hydriodic acid solution was found to have a proportion (p) of 100%. The cross-section of the membrane cut perpendicularly to the surfaces thereof was subjected to dyeing treatment with an aqueous Malachite Green solution having a pH value of 2. A layer having a thickness of about 6$\mu$ on the side of the membrane surface treated with the hydriodic acid solution was dyed blue while the rest of the cross-section of the membrane was dyed yellow. The maximum descending gradient ($|\Delta p/\Delta t|max$) of proportion (p) to thickness (t) was 19%/$\mu$.

The performance of the cation exchange membrane of this Comparative Example in use for electrolysis was evaluated in the same manner as in Example 1.

The changes of current efficiency and cell voltage with time are shown in Table 2.

TABLE 2

| Electrolysis time (hours) | 24 | 720 |
|---|---|---|
| Current efficiency (%) | 93 | 85 |
| Cell voltage (volts) | 4.3 | 4.6 |

After completion of the electrolysis, the used membrane was visually observed to find the occurrence of blistering. The cross-section of the used membrane cut perpendicularly to the surfaces thereof was visually observed to find the occurrence of partial peeling-off of the carboxylate group-containing surface layer portion of about 4$\mu$ in thickness.

COMPARATIVE EXAMPLE 2

A copolymer was prepared in substantially the same manner as in Example 1 except that the tetrafluoroethylene pressure was 5.0 Kg/cm$^2$ instead of 5.5 Kg/cm$^2$. Part of the copolymer was saponified with a mixture of 6 N aqueous caustic soda and methanol (1:1 by volume), and the ion exchange capacity of the saponified copolymer was examined to find an ion exchange capacity of 0.83 milliequivalent per gram of dry polymer. The rest of the copolymer was shaped into a membrane (C1) of 50$\mu$ in thickness.

On the other hand, 16 g of CF$_2$=CFO(CF$_2$)$_3$COOCH$_3$, 0.17 g of ammonium persulfate and water free of oxygen were charged into a 500 cc stainless steel autoclave. The resulting mixture was emulsified with ammonium perfluorooctanoate as an emulsifier. The copolymerization was carried out at 50° C. by introducing tetrafluoroethylene into the emulsion under a tetrafluoroethylene pressure of 7 Kg/cm$^2$ and using sodium hydrogensulfite as a promotor. Part of the copolymer was saponified with a mixture of 6 N aqueous caustic soda and methanol (1:1 by volume), and the ion exchange capacity of the saponified copolymer was examined to find an ion exchange capacity of 1.10 milliequivalents per gram of dry polymer. The rest of the copolymer was shaped into a membrane (C2) of 100$\mu$ in thickness.

The membranes (C1) and (C2) were heat-pressed in a state of close contact with each other to form a laminated membrane which was then saponified with a mixture of 6 N aqueous caustic soda and methanol (1:1 by volume).

The performance of the laminated cation exchange membrane of this Comparative Example in use for electrolysis was evaluated with the outer surface of the membrane (C2) stratum facing the cathode in the same manner as in Example 1.

The changes of current efficiency and cell voltage with time are shown in Table 3.

TABLE 3

| Electrolysis time (hours) | 24 | 720 |
|---|---|---|
| Current efficiency (%) | 92 | 84 |
| Cell voltage (volts) | 12.4 | 13.6 |

After completion of the electrolysis, the used laminated membrane was visually observed to find the occurrence of blistering all over the surface of the membrane. The cross-section of the used laminated membrane cut perpendicularly to the surfaces thereof was visually observed to find the occurrence of partial peeling-off at the border line of lamination of the membranes (C1) and (C2).

COMPARATIVE EXAMPLE 3

A copolymer having an ion exchange capacity due to sulfonate groups of 0.71 milliequivalent per gram of dry polymer and an ion exchange capacity due to carboxylate groups of 1.5 milliequivalents per gram of dry polymer when saponified with a mixture of 6 N aqueous caustic soda and methanol (1:1 by volume) was prepared from tetrafluoroethylene,

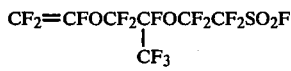

and $CF_2=CFO(CF_2)_4COOCH_3$ according to a customary method known in the art. The copolymer was shaped into a membrane of 250μ in thickness and saponified with a mixture of 6 N aqueous caustic soda and methanol (1:1 by volume).

The performance of the cation exchange membrane of this Comparative Example in use for electrolysis was evaluated in the same manner as in Example 1.

The changes of current efficiency and cell voltage with time are shown in Table 4.

TABLE 4

| Electrolysis time (hours) | 24 | 720 |
|---|---|---|
| Current efficiency (%) | 89 | 82 |
| Cell voltage (volts) | 3.8 | 3.7 |

EXAMPLES 2 AND 3

Cation exchange membranes were prepared in substantially the same manner as in Example 1 except that each of the mixed solutions as listed in Table 5 was used in place of a mixed solution as used in Example 1 and the immersion treatment in each of the mixed solutions was effected under treatment conditions as listed in Table 5.

With respect to each cation exchange membrane, the proportion (p) in the membrane surface treated with the mixed solution and the maximum descending gradient ($|\Delta p/\Delta t|$max) are listed in Table 5 together with that performance in use for electrolysis which was evaluated in the same manner as in Example 1.

After completion of the electrolysis, each of the used membranes was visually observed to find no physical damage such as partial peeling-off, cracking, blistering or the like.

TABLE 5

| Example No. | Mixed Solution | Treatment Conditions | Proportion(p) in Surface(%) | $\|\Delta p/\Delta t\|$max (%/μ) | Performance* 24 hours** | Performance* 720 hours** |
|---|---|---|---|---|---|---|
| 2 | 57 wt % hydriodic acid: propionic acid = 11:1 (by volume) | 72° C. 18 hours | 100 | 4 | $\frac{94}{4.3}$ | $\frac{94}{4.3}$ |
| 3 | 57 wt % hydriodic acid: n-caprylic acid = 500:1 (by weight) | 83° C. 20 hours | 100 | 4.2 | $\frac{93}{4.2}$ | $\frac{93}{4.2}$ |

Note
* $\frac{\text{current efficiency (\%)}}{\text{cell voltage (volts)}}$
** electrolysis time

EXAMPLE 4

A 250μ-thick membrane of a copolymer with pendant sulfonyl fluoride groups as prepared in Example 1 was treated on one surface thereof with a mixed solution of an aqueous 20 weight percent hydrazine solution and methanol (volume ratio=1:2) at room temperature for 16 hours. The resulting membrane was treated with an aqueous 1 N hydrochloric acid solution at 90° C. for 16 hours, saponified with a mixture of 6 N aqueous caustic soda and methanol (1:1 by volume), and treated with an aqueous 5 weight percent sodium hypochlorite solution at 90° C. for 16 hours. The A.T.R. of the cation exchange membrane thus obtained was then measured. The absorption band at 1690 $cm^{-1}$ characteristic of carboxylate (salt of carboxylic acid) groups was observed when the membrane surface treated with the mixed solution containing hydrazine was subjected to measurement of A.T.R. The proportion (p) in the membrane surface treated with the mixed solution was 80%. The maximum descending gradient ($|\Delta p/\Delta t|$max) was 7%/μ.

EXAMPLE 5

Two kinds of copolymers were prepared in substantially the same manner as in Example 1 except that the tetrafluoroethylene pressures were respectively 5.0 Kg/cm² and 7.0 Kg/cm². Part of each copolymer was saponified with a mixture of 6 N aqueous caustic soda and methanol (1:1 by volume), and the ion exchange capacity of the saponified copolymer was examined. The copolymer prepared under a tetrafluoroethylene pressure of 5.0 Kg/cm² and saponified had an ion exchange capacity of 0.91 milliequivalent per gram of dry polymer. The copolymer prepared under a tetrafluoroethylene pressure of 7.0 Kg/cm² and saponified had an ion exchange capacity of 0.75 milliequivalent per gram of dry polymer. The rest of the former copolymer was shaped into a membrane (E1) of 100μ in thickness, and the rest of the latter copolymer was shaped into a membrane (E2) of 50μ in thickness.

The membranes (E1) and (E2) were heat-pressed in a state of close contact with each other to form a laminated membrane. The laminated membrane was placed on a fabric of polytetrafluoroethylene in such a way that the outer surface of the membrane (E1) stratum was contacted with the fabric, and so heated in vacuo that the fabric was embedded in the membrane (E1) stratum for reinforcing the laminated membrane. The fabric of tetrafluoroethylene was an about 0.15 mm-thick leno woven fabric having 25 wefts per inch of a 400 denier multifilament and 25 warps per inch of a pair of a 200 denier multifilament.

In the same manner as in Example 1, the reinforced laminated membrane was converted into a membrane containing sulfonyl chloride groups, which was then treated on the outer surface of the membrane (E2) stratum with a mixed solution of an aqueous 57 weight percent hydriodic acid solution and glacial acetic acid (volume ratio=10:1) at 83° C. for 20 hours, followed by saponification with a mixture of 6 N aqueous caustic soda and methanol (1:1 by volume). The resulting membrane was further treated with an aqueous 5 weight percent sodium hypochlorite solution at 90° C. for 16 hours. The cross-section of the thus obtained cation exchange membrane cut perpendicularly to the surfaces thereof was subjected to dyeing treatment with an aqueous Malachite Green solution having a pH value of 2. A layer having a thickness of about 11μ on the side of the membrane (E2) surface treated with the mixed solution containing hydriodic acid was dyed blue while the rest of the cross-section of the membrane was dyed yellow. The proportion (p) in the membrane surface treated with the mixed solution was 85%. The maximum descending gradient (|Δp/Δt|max) was 4.5%/μ.

The performance of the reinforced laminated cation exchange membrane of this Example in use for electrolysis was evaluated in substantially the same manner as in Example 1 except that an aqueous 4 N caustic soda solution was circulated through the cathode chamber.

The changes of current efficiency and cell voltage with time are shown in Table 6.

TABLE 6

| Electrolysis time (hours) | 24 | 720 |
|---|---|---|
| Current efficiency (%) | 93 | 93 |
| Cell voltage (volts) | 4.2 | 4.2 |

After completion of the electrolysis, the used membrane was visually observed to find no physical damage such as partial peeling-off, cracking, blistering or the like.

EXAMPLES 6 TO 9

From sulfonyl chloride group-containing membranes as prepared in Example 5, reinforced laminated cation exchange membranes were prepared in substantially the same manner as in Example 5 except that each of the mixed solutions as listed in Table 7 was used in place of a mixed solution as used in Example 5 and the immersion treatment in each of the mixed solutions was effected under treatment conditions as listed in Table 7.

With respect to each cation exchange membrane, the proportion (p) in the membrane surface treated with the mixed solution and the maximum descending gradient (|Δp/Δt|max) are listed in Table 7 together with that performance in use for electrolysis which was evaluated in the same manner as in Example 5.

After completion of the electrolysis, each of the used membranes was visually observed to find no physical damage such as partial peeling-off, cracking, blistering or the like.

TABLE 7

| Example No. | Mixed Solution | Treatment Conditions | Proportion(p) in Surface(%) | \|Δp/Δt\|max (%/μ) | Performance* 24 hours** | Performance* 720 hours** |
|---|---|---|---|---|---|---|
| 6 | 57 wt % hydriodic acid: glacial acetic acid = 2:1 (by volume) | 60° C. 17 hours | 60 | 4.3 | 92/4.1 | 92/4.1 |
| 7 | 57 wt % hydriodic acid: propionic acid = 3:1 (by volume) | 60° C. 17 hours | 40 | 5.0 | 90/4.0 | 90/4.0 |
| 8 | 47 wt % hydrobromic acid: glacial acetic acid = 3:1 (by volume) | 90° C. 16 hours | 65 | 3.5 | 92/4.1 | 92/4.1 |
| 9 | 30 wt % hypophosphorous acid: n-caprylic acid = 600:1 (by weight) | 90° C. 16 hours | 53 | 4.0 | 91/4.0 | 91/4.0 |

Note
* current efficiency (%) / cell voltage (volts)
**electrolysis time

EXAMPLE 10

A reinforced laminated cation exchange membrane was prepared in substantially the same manner as in Example 6 except that a mixed solution of an aqueous 57 weight percent hydriodic acid, glacial acetic acid and n-caprylic acid (volume ratio=2:1:0.003) was used in place of a mixed solution as used in Example 6. The proportion (p) in the membrane surface treated with the mixed solution was 61%, and the maximum descending gradient (|Δp/Δt|max) was 4.2%/μ.

What is claimed is:

1. In a process for the preparation of a fluorinated cation exchange membrane used for electrolysis comprising treating, with a treating agent selected from the group consisting of an aqueous reducing solution of an inorganic acid, an aqueous reducing solution of an inorganic salt, an aqueous reducing solution of hydrazine, an aqueous reducing solution of an inorganic acid and an inorganic salt, and an aqueous reducing solution of an inorganic salt and hydrazine, one surface of a membrane comprising a fluorocarbon polymer containing pendant groups of the formula (3):

$$-OCF_2CF_2SO_2X \qquad (3)$$

wherein each X independently is fluorine, chlorine, bromine, hydrogen, ammonium, a quaternary ammonium or a metal atom, to convert part of the pendant groups of the formula (3) into pendant groups of the formula (1):

$$-OCF_2COOM \qquad (1)$$

wherein each M independently is hydrogen, ammonium, a quaternary ammonium or a metal atom, said fluorinated cation exchange membrane comprising a fluorocarbon polymer containing pendant carboxylic acid and/or carboxylate groups and pendant sulfonic acid and/or sulfonate groups, the proportion of the density of pendant carboxylic acid and/or carboxylate groups relative to the total density of pendant carboxylic acid and/or carboxylate groups and pendant sulfonic acid and/or sulfonate groups being different between one surface and an internal plane in cross-section parallel to the surfaces of the membrane;

the improvement wherein one surface of a membrane comprising a fluorocarbon polymer containing pendant groups of the formula (3):

$$-OCF_2CF_2SO_2X \qquad (3)$$

wherein each X independently is fluorine, chlorine, bromine, hydrogen, ammonium, a quaternary ammonium or a metal atom, is treated with a treating agent selected from the group consisting of an aqueous reducing solution of at least one inorganic acid, an aqueous reducing solution of at least one inorganic salt, an aqueous reducing solution of hydrazine, an aqueous reducing solution of at least one inorganic acid and at least one inorganic salt, and an aqueous reducing solution of at least one inorganic salt and hydrazine, in the presence of at least one reaction controlling agent selected from the group consisting of $C_1$-$C_{12}$ carboxylic acids, $C_1$-$C_{12}$ sulfonic acids, $C_1$-$C_{12}$ alcohols, $C_1$-$C_{12}$ nitriles and $C_2$-$C_{12}$ ethers, provided that when the treating agent includes hydrazine, said at least one reaction controlling agent is selected from $C_1$-$C_{12}$ alcohols, $C_1$-$C_{12}$ nitriles and $C_2$-$C_{12}$ ethers, thereby to prepare a fluorinated cation exchange membrane which comprises a fluorocarbon polymer containing pendant groups of the formula (1):

$$-OCF_2COOM \qquad (1)$$

wherein each M independently is hydrogen, ammonium, a quaternary ammonium or a metal atom, and pendant groups of the formula (2):

$$-OCF_2CF_2SO_3M \qquad (2)$$

wherein each M independently is as defined above, and wherein the proportion (p) represented by the equation (a):

$$p = A/(A+B) \times 100 (\%) \qquad (a)$$

wherein A is the density of pendant groups of the formula (1) and B is the density of pendant groups of the formula (2), is at least 20% in one surface of the membrane, and said proportion (p) gradually decreases from the one surface to the other surface or to that plane within the membrane where A reaches zero, said proportion (p) and a thickness (t) in microns between the one surface and the other surface or a plane within the membrane in cross-section parallel to the surfaces of the membrane satisfying the following inequality (b):

$$|\Delta p/\Delta t| = 12 (\%/\mu) \qquad (b).$$

2. A process according to claim 1, wherein said treating agent and said at least one reaction controlling agent are in the form of a mixture thereof.

3. A process according to claim 1 or 2, wherein X is chlorine.

4. A process according to claim 3, wherein said membrane to be treated is made of a composite membrane composed of two kinds of films of fluorocarbon polymers differing in equivalent weight by 150 or more, and wherein the outer surface of the film of the fluorocarbon polymer with a higher equivalent weight is treated as recited therein.

* * * * *